Figure 1:
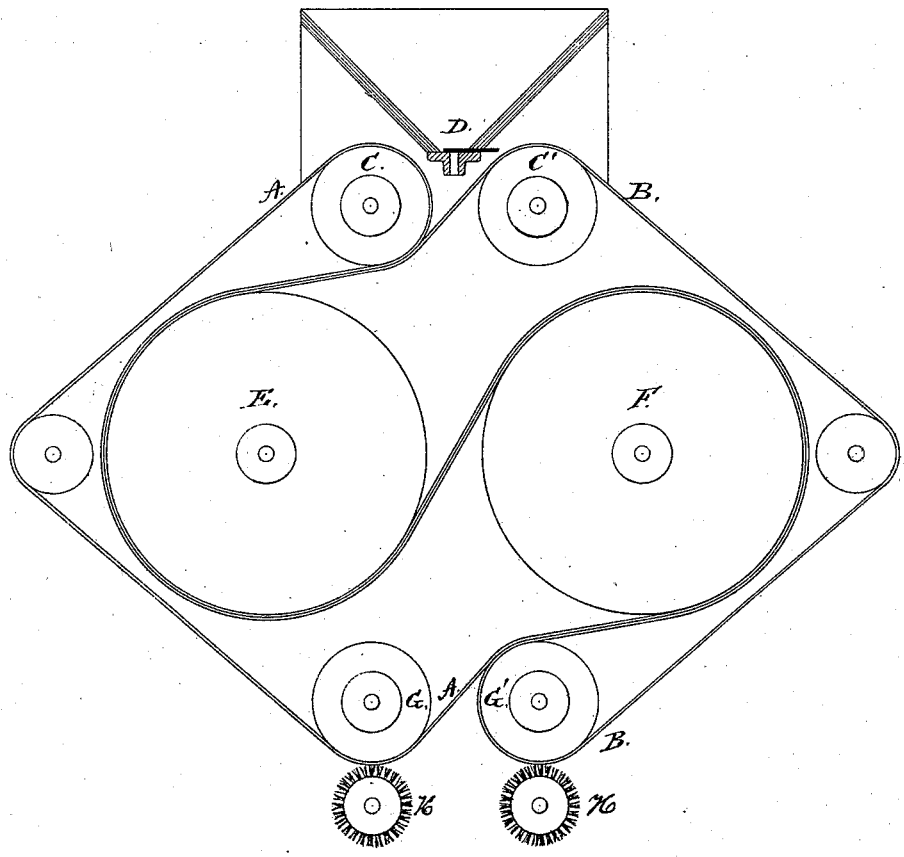

2 Sheets—Sheet 1.

S. R. BRADLEY.
APPARATUS FOR DRYING.

No. 173,889. Patented Feb. 22, 1876.

WITNESSES.
Saml. F. Hay
Boyd Eliot

Stephen R. Bradley
INVENTOR.

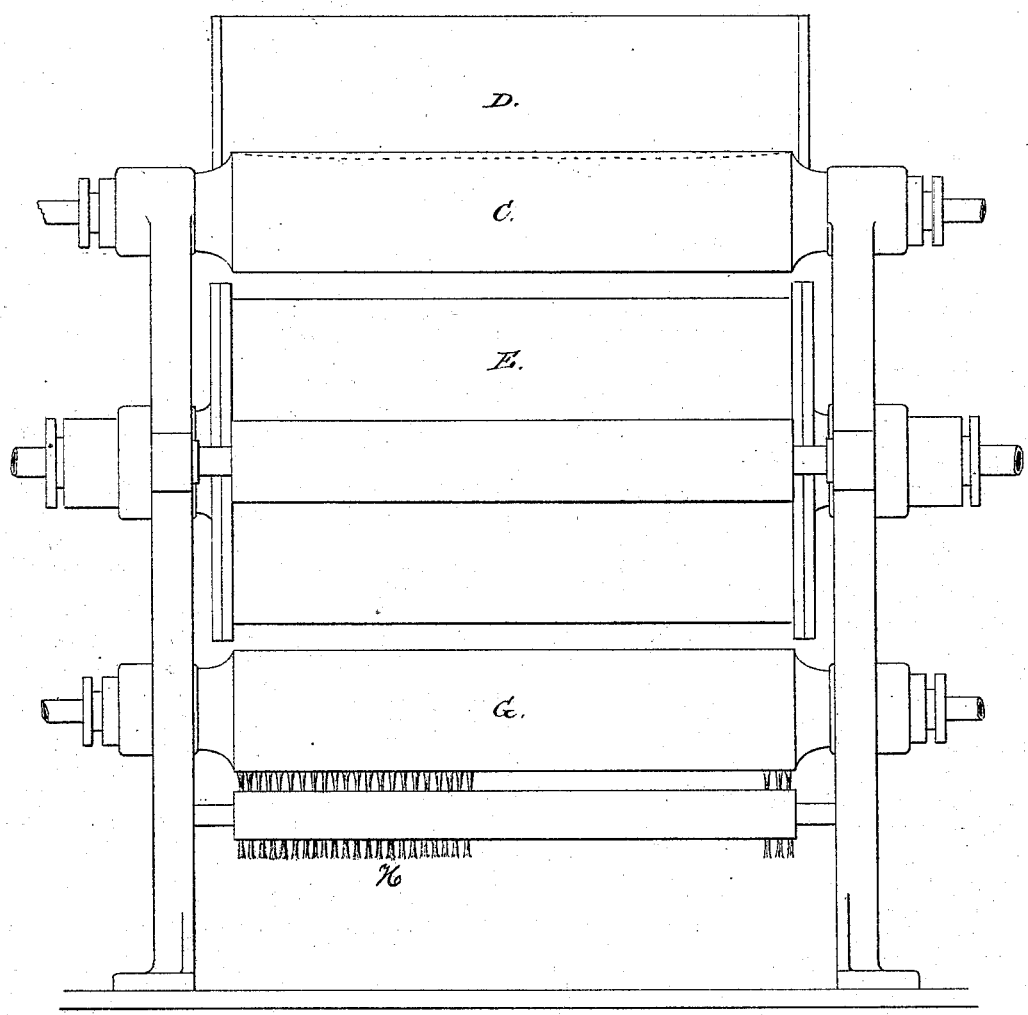

UNITED STATES PATENT OFFICE.

STEPHEN R. BRADLEY, OF BROOKLYN, NEW YORK.

IMPROVEMENT IN APPARATUS FOR DRYING.

Specification forming part of Letters Patent No. 173,889, dated February 22, 1876; application filed December 18, 1873.

*To all whom it may concern:*

Be it known that I, STEPHEN R. BRADLEY, of the city of Brooklyn, county of Kings, and State of New York, have invented certain Improvements in Apparatus for Drying Colors, &c., of which the following is a specification:

This invention consists in the combination of the hopper, revolving brushes, belts, rolls and calender-rollers, substantially as hereinafter described.

Figure 1 represents an end view of the apparatus, showing the edge of the two belts when applied to work upon calender-rolls. Fig. 2 is a side elevation of the same machine.

As will be seen by a reference to the drawing, the two belts, as at A and B, are arranged to travel around a series of rolls, as at C C', which may be simply carrier rolls to both the belts in such proximity to a hopper, as at D, as that the material to be dried may readily fall from the hopper to a point between the two belts and then be conducted by and between them to and partially around a calender-roll, as at E, on one side of the machine, and thence across to another heated or calender roll, as at F, and so on back and forth over as many rolls as may be required for the operation, until the substance is sufficiently dry to allow the belts to be separated, or the operation is completed, where the two belts are so conducted around the rolls as at G G', which separates them and the material either falls off, or is brushed, scraped, or removed by the revolving brushes H H, which act upon the belts as they traverse the various rolls. Said rolls may be driven by gearing in the usual manner, or otherwise, as convenient.

It is also evident that the belts for carrying the substances must be of some open or porous materials, so that evaporation can take place through them.

The hopper at the top must also be constructed in such a manner as to guide the material properly between the belts, and may be provided with slides or valves, so as to graduate the proper quantity to be properly dried before the belts separate. This, of course, will depend upon the quantity of moisture and the drying capacity of the air.

An exhaust-fan may also be used in combination with such an apparatus; and so, also, may a thermostat or a hygrometric apparatus be arranged to control the supply of material to the belts, as in the drying of colors it is often essential that the temperature should not rise above a certain point, and as they will be introduced between the belts in a liquid state, the quantity must be nicely controlled; but of this I do not make any claim in my present application; but What I do claim is—

The combination of the hopper D, revolving brushes H H, belts A B, rolls G G' C C', and callender-rollers E F, substantially as described.

STEPHEN R. BRADLEY.

Witnesses:
SAML. F. HAY,
BOYD ELIOT.